April 6, 1971 A. BONNET 3,574,027
METHOD OF MANUFACTURING HEAT INSULATING
PRODUCTS, SUCH AS SHELLS
Filed May 26, 1967 2 Sheets-Sheet 1

INVENTOR
A. BONNET
BY Emmett F. Salter
ATTORNEY

April 6, 1971  A. BONNET  3,574,027
METHOD OF MANUFACTURING HEAT INSULATING
PRODUCTS, SUCH AS SHELLS
Filed May 26, 1967  2 Sheets-Sheet 2

INVENTOR
ALAIN BONNET

BY Emmett F. Salter
ATTORNEY

United States Patent Office 3,574,027
Patented Apr. 6, 1971

3,574,027
METHOD OF MANUFACTURING HEAT INSULATING PRODUCTS, SUCH AS SHELLS
Alain Bonnet, Clermont, France, assignor to Compagnie de Saint-Gobain, Neuilly-sur-Seine, Hauts-de-Seine, France
Filed May 26, 1967, Ser. No. 641,686
Claims priority, application France, June 3, 1960, 64,054
Int. Cl. B65h 81/02
U.S. Cl. 156—191                          8 Claims

ABSTRACT OF THE DISCLOSURE

The invention concerns the production of laminated bodies of insulation from a mat of mineral fibers which is impregnated with a polymerizable synthetic resin and additions of refractory mineral compositions to control the cellular structure of the bodies and their consequent insulating properties following the heating thereof. More particularly, the invention contemplates the production of cylindrical insulating shells for pipes or conduits subjected to high temperatures by winding a plurality of layers of a mat of glass fibers having an unpolymerized resin interspersed therethrough, while spraying onto the mat, before and/or during the winding operation, an aqueous dispersion of a refractory mineral composition in controlled amounts. The subsequent heating of the mandrels bearing the spirals of the mat, results in the polymerization of the resin and the vaporization of the water component of the dispersion, leaving a body of glass fibers bound together by a hardened polymerized resin and also by a skeletal framework of bonds of hardened refractory material, the density of which increases relatively to the fibers from the exterior of the shell to the interior thereof, whereat the maximum heat-insulating effects are desired.

---

The present invention relates to the production of insulating products, such as shells, adapted to effect the heat insulation of walls which are raised to high temperature.

The thermal insulation of tubes or pipe lines carrying fluids at high temperature is advantageously realized by means of shells surrounding these conduits, constituted of fibers, particularly glass fibers which are bonded by an organic synthetic resin and to which are added refractory mineral charges.

It has been determined that in order for these shells to be most effective, it is necessary that they present a different proportion of refractory mineral charges with respect to the mineral fibers, such as glass fibers, in their successive constituent layers, from the interior toward the exterior of the shells.

In particular, it has been determined that the inner layers which are subjected to higher temperatures, should contain a greater proportion of refractory mineral charges. At high temperature these charges form a skeletal framework of greater thermal resistance. In addition, the densification of the inner layers by the refractory mineral charges improves their insulating properties at high temperature. On the other hand, the outer layers of the shell subjected to less severe heat conditions, may be charged with relatively little refractory mineral materials, because the insulating ability of these materials on the external layers which are exposed to lower temperatures, would be lessened. Thus, it is preferable for these layers to remain predominantly fibrous, indeed, even only fibrous.

Therefore, it is the object of the present invention to provide a new industrial product in the form of shells which may be used for heat insulation at high temperature, constituted by mineral fibers, and particularly glass fibers, bound by an organic synthetic resin, to which are added mineral elements consisting of refractory mineral charges, which eventually are joined by mineral bonds and which present an increasing proportion of these mineral elements from the exterior to the interior. Advantageously, this increase is continuous across the thickness of the shell, or across its different zones, in such a way as to define a number of zone of different mean density corresponding to the desired specific heat insulating properties. The density of each zone may be uniform, or it may increase from the exterior to the interior.

The present invention also contemplates a process which allows for varying the proportion between the mineral elements and the mineral fibers, such as glass fibers, in any desired quantity, across the thickness of the insulating product thus obtained, for example, a cylindrical shell.

This process consists essentially in forming a pad or mat of mineral fibers, such as glass fibers, which accommodates a sizing having a base of polymerizable organic resin, but not yet polymerized, and in making this mat move into the operative zone where one or several devices deposit onto the mat an aqueous dispersion of mineral elements constituted by refractory mineral charges which eventually are interconnected by mineral bonds. The rate of the advance of the mat and/or the output of said depositing devices are regulated in such a way as to vary in any desired degree the proportion between the mineral fibers and the added mineral elements, either progressively or in incremental steps. The pad is conformed into a number of superposed layers in order to impart thereto the desired thickness and shape, and finally the product thus obtained is heated in order to eliminate the water of dispersion and to polymerize the organic resin.

In the production of shells, the pad is first impregnated and charged with mineral elements in a manner to attain a decrease in its density in proportion to its advance, and is wound about a mandrel or equivalent device, and is then carried on this mandrel to the heating device.

It is another object of the invention to provide an apparatus for executing efficiency the process described above.

The different characteristics and advantages of the apparatus according to the invention will appear from the following description of one possible embodiment thereof. The illustrative example should not be construed as limitative of the invention since other forms, proportions and arrangements may be adopted without going beyond the purview and scope of the invention.

In the course of this description, reference is made to the attached drawings wherein.

Figure 1:
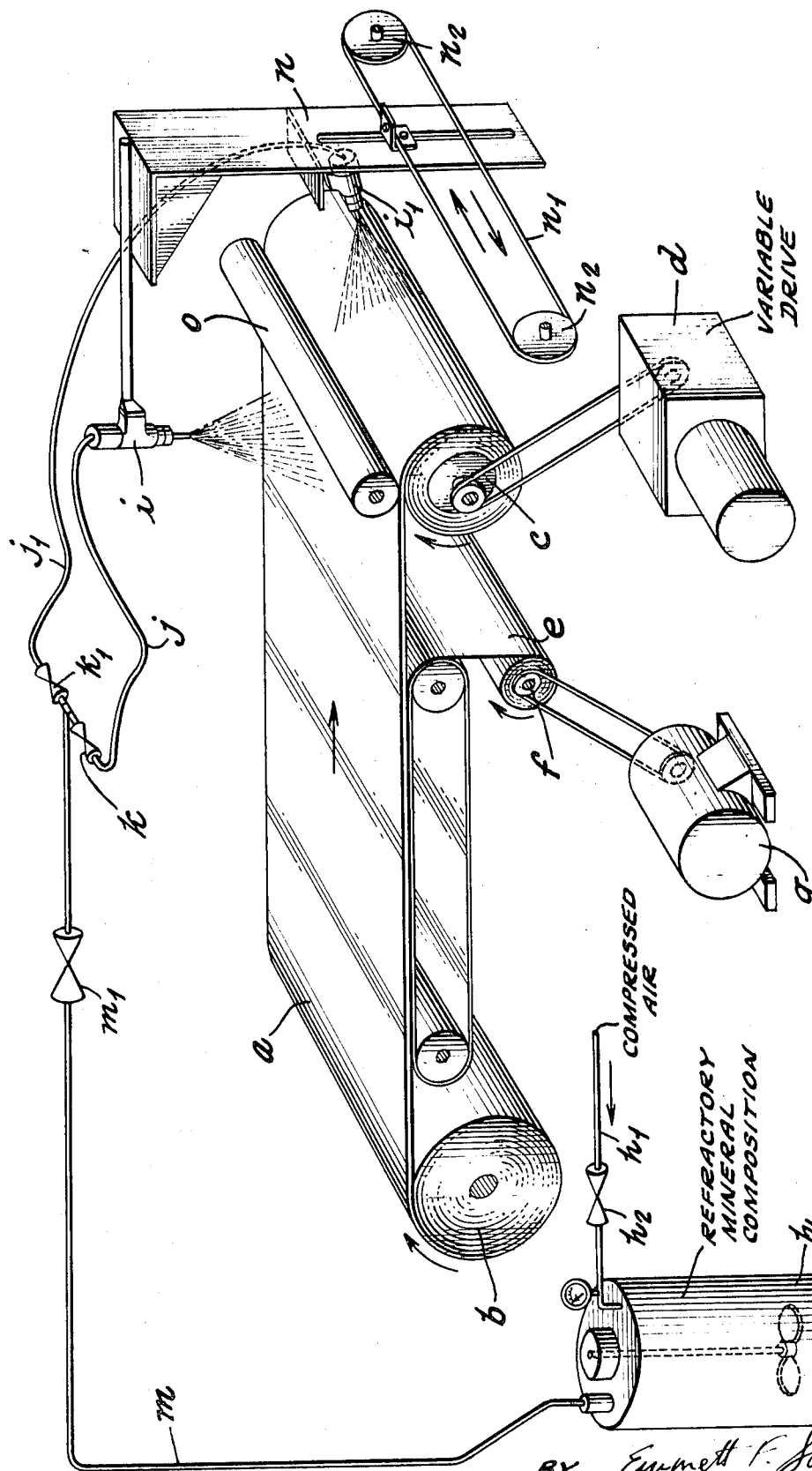
FIG. 1 is a perspective schematic view of one installation according to the invention.

The pad or mat $a$, formed of fine glass fibers and sized with a polymerizable organic resin, but not yet polymerized, is unrolled from a delivery roll $b$ onto a receiving mandrel $c$, which is rotated by a variable drive mechanism $d$.

The pad $a$ rests on a sheet of paper $e$ which travels as fast as the pad to a core on an axle $f$, operated by a motor $g$.

The refractory mineral charges, contained in a supply vat $h$ fed with compressed air through a tube $h_1$ provided with a valve $h_2$, are projected onto the mate $a$, in the illustrated embodiment, by means of two high-speed spray guns $i$, $i_1$ which are joined by flexible conduits $j$, $j_1$ to valves $k$, $k_1$, at the end of main conduit $m$ leading from the supply vat $h$, and in which is disposed a control valve $m_1$. The pneumatic spray guns $i$, $i_1$ are mounted on a mobile carriage $n$, which executes an alternating rectilinear motion in a direction perpendicular to the direction of the forward movement of the mat, by means of a band $n_1$ travelling between two pulleys $n_2$, one of which is driven by any known means (not shown). Thus, the spray guns $i$ and $i_1$ are able to sweep across the surface of the mat, while projecting the aqueous dispersion of mineral charges thereonto in regular manner during the travel of the mat, the spray gun $i$ impregnating the mat before its winding, and spray gun $i_1$ during its winding, on mandrel $c$.

A presser roller $o$ located above mandrel $c$, on one hand makes possible an improved homogeneous distribution of the dispersion of the interior of the mat, and on the other hand, the obtention of the desired density for the different layers of the shell.

For a predetermined production of a shell, the mandrel $c$ may have a fixed speed of rotation; (this speed may be varied by means of variable drive $d$, if that is necessary when shells of different diameters are produced). In this case the speed of travel of the mat below spray gun $i$ increases simultaneously with the thickness of the shell. If the feeding of mineral dispersion is also maintained constant, there is then obtained an almost continuous decrease of the ratio of the mineral elements to the glass fibers, from the beginning to the end of the pad and thus from the interior layers toward the outer layers of the shell. The above ratio can be modified to a greater degree in stages either by stopping gun $i_1$, or by modifying the flow from the guns, for example, by varying the air pressure in the dispersion supply vat $h$.

It is quite evident that arresting the two guns allows the finishing of the shell with only the fibrous mat on the outer layers of the shell, which layers are exposed to the lowest temperatures.

After its formation, the shell, still mounted on its mandrel, is dried, for example, in a hot air oven or furnace. This serves, on the one hand, to eliminate the water from the mineral dispersion, and on the other hand to polymerize the organic resin. The latter will assure cohesion of the materials in the zone containing the mineral elements as well as in the zone of fibers only, for the period of time required for storing the shell between its production and its utilization.

In order to decrease the cost of the installation and simplify its maintenance, instead of the two spray guns mounted on a mobile carriage, a frame, mounting fixed spraying devices, which are not pneumatically operated, may be disposed across the entire width of the mat. For example, at least three groups of sprays may be mounted on three rail frames for impregnating the pad before it is wound on the mandrel, and optionally, one group of sprays may be used for impregnating it while it is being wound.

The distribution of the spraying devices on these frames should be such that their jets, preferably flat and perpendicular to the direction of travel of the glass wool mat, define a substantially homogeneous spraying pattern.

In order to more conveniently attain high values of the ratio of mineral elements to glass fibers, recourse can be had to a damming device which may be placed over the entire width of the mat, upstream of the mandrel. This dam may be completed by a suction device disposed under the conveyor belt for the glass fiber mat, so as to improve the absorption of the impregnation, and to make it more homogeneous at the interior of the fibrous pad.

When the pad is completely wound on mandrel $c$, the mass thus formed is heated so as to eliminate the water of dispersion of the mineral charges and to induce polymerization of the organic resin. This heating can be done in a hot air oven, preferably with internal heating of the mandrel at a temperature above that which prevails in the oven.

The heating may also be realized advantageously by high frequency losses which permit the elimination of the established phenomenon found in hot air ovens, namely, the preferential drying of the surfaces of the zone or zones where the proportion of mineral charges is preponderant, a "crust" is formed, which retards the evacuation of water contained in this zone or zones.

From the preceding, it is apparent that by virtue of the process according to the invention, and by means of an installation such as the one just described, there can be obtained, with a large range of possibilities, shells in which the ratio between the fibrous material and the added refractory mineral charges varies, across the shell, in any desired ratio.

Figure 2:
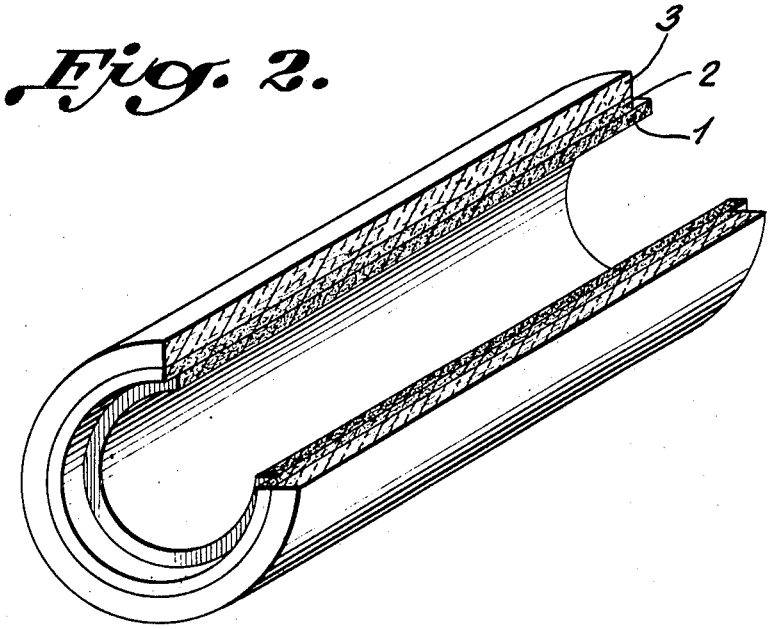
FIG. 2 is a perspective view, with certain parts in section, of a shell produced in accordance with the process and apparatus of the invention.

Thus, a shell such as the one represented by way of non-limiting example in FIG. 2. of the attached drawings, can be attained. Such a shell may have an inner diameter of about 273 mm. and thickness 100 mm., and may be composed of three zones 1, 2 and 3 from the interior to the exterior thereof. The physical characteristics of these zones are tabulated in the following table:

|  | Density in kg./cu. meter | Thickness in mm. | Original length of mat in meters | Supply guns, grams/min. | |
|---|---|---|---|---|---|
|  |  |  |  | Gun $i$ | Gun $i_1$ |
| Zone 1: Glass fibers and mineral elements | 300 | 30 | 10.5 | 2,960 | 2,200 |
| Zone 2: Glass fibers and mineral elements | 200 | 25 | 10.4 | 2,960 | |
| Zone 3: Glass fibers only | 65 | 45 | 13.3 | | |

The densities indicated for zones 1 and 2 may be mean densities; the proportion of mineral charges may be advantageously varied progressively towards the interior of each of these zones.

To obtain a shell according to the inventive process disclosed herein, the following constituent elements may be advantageously used, which are indicated simply by way of example:

(1) The pad or mat of glass fibers may be formed of original fibers having a means diameter of 5 to 6 microns. However, the use of fibers of greater means diameter, for example, up to 14 microns, facilitates the impregnation of the pad by the mineral dispersion. The weight of the mat may range from 100 grams to 400 grams per square meter. It has been found advantageous to use a mat having a weight of 250 grams per square meter.

The organic sizing for the fibers preferably consists of a phenol-formaldehyde resin, a copolymer phenol-urea resin, or again, a resin consisting of a copolymer phenol-melamine resin. The use of this last-mentioned type of resin permits the disposition of the zone of fibers only, having the maximum limit of temperature resistance, consequently reducing to a minimum the thickness of the associated zone of glass fibers and mineral elements. The content of the binder in the mat amounts to 6% to 8% by weight, after polymerization.

(2) The mineral dispersion which is sprayed onto the mat may be constituted by an aqueous dispersion of clay associated with one or several charges and different adjuvants. These additional helpful ingredients serve to impart to the dispersion the following properties: The dry content or extract is preferably high, ($\geqslant 50\%$), in order to decrease the cost of drying the shells. However, the dry content may be less than 50%. The dispersion should have a high penetration capacity of the fibrous pad, hence a weak consistency (≤15 sec. per section, AFNOR No. 4 and at 25° C.) and low surface tension (≤30 dynes/cm. at 25° C.). (AFNOR is the abbreviation for the French Bureau of Standards, "Association Francaise de Normalization").

The dispersion should be capable of predetermined formation of a coherent solid phase, after drying with the fibrous pad, which is otherwise maintained in shape by the polymerized organic binding, as well as the predetermined formation at high temperatures of a dimensionally stable ceramic gangue which is well resistant to mechanical strains.

The clay should preferably be of the kaolin type with an oil content not exceeding 45% (AFNOR Standard). The size of the granules should be such that 90% of them have a diameter less than 10 microns.

The additional ingredients may be advantageously comprised of one or several other charges whose particles have a lamellar or needle shape, such as talc, (non-micronized), and Wollastonite (calcium silicate); a dispersing agent; a very active wetting agent; a pH regulating agent, and optionally, a mineral binder to reinforce the cohesion of materials in the zone of the shell where the temperature is such that the baked hardening of the clay and mineral elements is not complete, by virtue of the disappearance of the organic binder.

The following table tabulates three examples, in no wise limiting, of formulations of mineral dispersions in accordance with the instant invention.

"Talc O" is a commercial product chiefly constituted by:

| | Percent |
|---|---|
| $SiO^2$ | 48.3 |
| MgO | 32.4 |
| $Al^2O^3$ | 8.9 |

"Daxad 30 S" is an anionic tensio-active dispersing agent constituted by a salt of an unsaturated aliphatic organic acid.

"Céponol D H" is a dialkyl-sulfosuccinate of sodium.

"Ludox H S" is a colloidal silica with 30% silica.

The process according to the invention permits the attainment of combinations of glass fibers and mineral elements having an extremely wide range of usable densities, between 150 and 500 kg. per cubic meter, the density of the fibrous matrix itself having a density between 75 and 100 kg. per cubic meter.

By way of non-limiting examples, characteristics of two shells adjusted for different temperature limits which may be encountered are indicated below:

Their geometric dimensions may be defined by an inner diameter of 273 mm. and a thickness of 100 mm.

EXAMPLE 1

Shell having operational temperature limit of 700° C.

This example is illustrated in FIG. 2, and it comprises, as mentioned above, three zones 1 to 3, going from the inside to the outside of the shell, and corresponding to three principal gradients of temperature, notably delimited by temperatures of 550° C. and 400° C. These temperatures correspond firstly, to the characteristics of the glass

| | Formula 1 | Percent | Formula 2 | Percent | Formula 3 | Percent |
|---|---|---|---|---|---|---|
| Clay | "Chinaclay D, and D" | 49.53 | "B 24" (white minerals of Paris) | 35.20 | "B 24" | 32.90 |
| Other charge | "Wollastonite" P1 | 8.25 | "Talc O" (Luzenac) | 12.30 | "Talc O" | 16.50 |
| Dispersing agent | "Daxad 30 S"[1] | 0.40 | "Daxad 30 S" | 0.33 | "Daxad 30 S" | 0.66 |
| Wetting agent | "Céponol D H" | 0.02 | "Céponol D H" | 0.05 | "Céponol D H"[2] | 0.50 |
| pH agent | Ammonia | 0.05 | Ammonia | 0.02 | {Ammonia | 0.04 |
| | | | | | {Sodium carbonate | 0.10 |
| Mineral binding | "Ludox H S" | 6.75 | "Ludox H S" | 7.80 | | |
| Water | Water | 35.00 | Water | 44.30 | Water | 49.30 |
| Total | | 100.00 | | 100.00 | | 100.00 |

[1] In 25% aqueous solution.
[2] In 15% solution in butyl glycol.

"Chinaclay D and D" is a commercial product principally constituted by a silico-aluminate of the following composition:

| | Percent |
|---|---|
| $SiO^2$ | 44.2 |
| $Al^2O^3$ | 40 |
| Loss on ignition | 13.7 |

"B 24" is a commercial product chiefly constituted by a silicoaluminate of the following composition:

| | Percent |
|---|---|
| $SiO^2$ | 45.9 |
| $Al^2O^3$ | 37 |
| Loss on ignition | 12.97 |

"Wollastonite P1" is a commercial product with the following principal composition:

| | Percent |
|---|---|
| $SiO^2$ | 51 |
| CaO | 47 | being used, and secondly to the characteristics of the glass fiber system with the organic bonds therefor.

The mineral elements are not associated with the glass fibers except in zones 1 and 2 and in greater quantity in zone 1 than in zone 2.

The characteristics of such a shell are set forth in the following table:

| | Temperature gradient | Thickness, mm. | Densities (kg./cu. meters) | | |
|---|---|---|---|---|---|
| | | | Glass fibers | Mineral elements | Total of glass fibers and mineral elements |
| Zone 1 | 700 to 550° C | 30 | 85 | 215 | 300 |
| Zone 2 | 550 to 400° C | 25 | 85 | 115 | 200 |
| Zone 3 | 400° C to ambient atmosphere. | 45 | 65 | | 65 |
| Complete shell | | 100 | 75 | 81 | 156 |

EXAMPLE 2

Shell having operational temperature limit of 600° C.

This shell has only two zones, numbered 1 and 2, going from the interior to the exterior of the shell, and corresponding to two principal temperature gradients, delimited by 400° C. temperature (see above).

The mineral elements are associated with the glass fibers in zone 1 only.

The characteristics of such a shell are given in the following table:

|  | Temperature gradient | Thickness, mm. | Densities (kg./cu. meters) | | |
|---|---|---|---|---|---|
|  |  |  | Glass fibers | Mineral elements | Total of glass fibers and mineral elements |
| Zone 1 | 600 to 400° C | 45 | 85 | 145 | 230 |
| Zone 2 | 400° C. to ambient atmosphere. | 55 | 65 | ---------- | 65 |
| Complete shell | | 100 | 72.5 | 55.5 | 128 |

Figure 3:
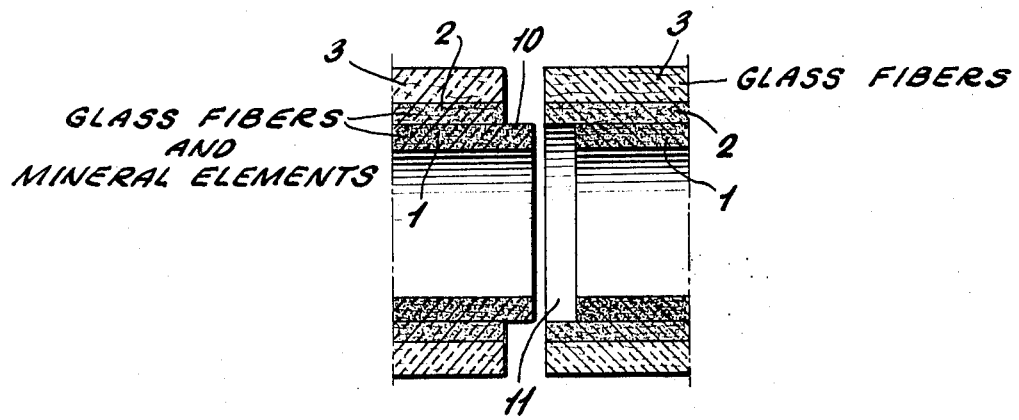
FIG. 3 is a longitudinal sectional view of the extremities of two adjacent shells, arranged for fitting them together.

When the manufacture of the shells is finished, it is advantageous to give their extremities a special shape, by machining, such as that shown by way of example in FIG. 3. A cylindrical projection 10 at one end of one shell is adapted to fit within a corresponding cavity 11 in the opposite end of the adjacent shell. This projection and groove or cavity are produced in the zones of the shell which offer the best mechanical characteristics. At the moment they are mounted on tubing, the shells are capable of being fitted one in the other, so that the extension of the tubing, when it is used at high temperature, cannot give rise to a space of poor insulation between the two shells.

In addition, a glass tarlatan or thin fabric may be wound about the last spiral of the shell when it is formed, so as to improve its final outer appearance. Polymerization of the organic binder of this last layer will assure adhesion of the tarlatan to the glass fibers.

Of course, the invention allows for numerous variations without departing from its essential principles.

I claim:

1. The method of producing an insulating body from successive laminations of a mat of mineral fibers impregnated with a polymerizable organic resin, which comprises combining a plurality of laminates of said mat, applying an aqueous dispersion of a refractory mineral composition between said laminates, varying the proportion of the aqueous dispersion applied to the successive laminates as the insulating body is built up, and heating the formed insulating body to effect the polymerization of the organic resin and to eliminate the water of said dispersion to attain an insulating body of mineral fibers bound together by said hardened resin as well as by a skeletal framework of hardened refractory material of varying density through the thickness thereof.

2. The method set forth in claim 1 wherein the mat is formed of glass fibers and the laminates are in the form of successive turns on a cylindrical mandrel to form a cylindrical shell for insulating a cylindrical conduit, including the step of spraying the refractory mineral composition onto said laminates in a decreasing proportion relative to the glass fibers as the cylindrical shell is built up.

3. The method set forth in claim 2 wherein the spraying of the refractory mineral composition onto the mat is prior to the winding of the mat onto the mandrel.

4. The method set forth in claim 3 wherein additional refractory mineral composition is sprayed onto the mat during the winding of the mat onto the mandrel.

5. The method set forth in claim 3 wherein the coated mat is compressed as the same is wound on the mandrel.

6. The method set forth in claim 1 wherein the polymerizable organic resin is selected from the group consisting of phenol-formaldehyde resin, phenol-urea resin and phenol-melamine resin.

7. The method set forth in claim 1 wherein the aqueous dispersion of refractory mineral composition comprises, in addition to the water, a major amount of clay in fine particle form with minor amounts of modifying agents selected from the group of mineral particles of lamellar or needle shape, a dispersing agent, an active wetting agent, and a pH regulating agent.

8. The method set forth in claim 7 wherein the modifying agents include a mineral binder susceptible of containing a substantial proportion of colloidal material such as colloidal silica.

References Cited
UNITED STATES PATENTS

| 2,076,456 | 4/1937 | Gams et al. | 138—141 |
| 2,609,319 | 9/1952 | Boge | 156—184X |
| 2,723,705 | 11/1955 | Collins | 156—188X |
| 2,801,945 | 8/1957 | Rogers et al. | 138—141 |
| 2,877,150 | 3/1959 | Wilson | 156—190 |
| 2,991,808 | 7/1961 | Siegmann et al. | 138—141 |
| 3,053,715 | 9/1962 | Labino | 138—149X |
| 3,054,428 | 9/1962 | Crawford | 138—141 |
| 3,295,559 | 1/1967 | Beasley et al. | 138—141 |
| 3,390,703 | 7/1968 | Matlow | 138—149X |

BENJAMIN R. PADGETT, Primary Examiner

G. G. SOLYST, Assistant Examiner

U.S. Cl. X.R.

138—145, 151; 156—185